(12) United States Patent
Tsushima

(10) Patent No.: US 12,364,255 B2
(45) Date of Patent: Jul. 22, 2025

(54) FISHING SPINNING REEL

(71) Applicant: GLOBERIDE, Inc., Tokyo (JP)

(72) Inventor: Daisuke Tsushima, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 248 days.

(21) Appl. No.: 18/113,466

(22) Filed: Feb. 23, 2023

(65) Prior Publication Data

US 2023/0309525 A1     Oct. 5, 2023

(30) Foreign Application Priority Data

Mar. 31, 2022 (JP) .................................. 2022-057881

(51) Int. Cl.
     *A01K 89/01*      (2006.01)

(52) U.S. Cl.
     CPC .. *A01K 89/0108* (2013.01); *A01K 89/011221* (2015.05)

(58) Field of Classification Search
     CPC .... A01K 89/011221; A01K 89/011223; A01K 89/0117; A01K 89/03
     See application file for complete search history.

(56) References Cited

U.S. PATENT DOCUMENTS

| | | | |
|---|---|---|---|
| 5,927,630 A | 7/1999 | Katayama | |
| 2009/0200412 A1* | 8/2009 | Hoshi | A01K 89/0117 242/243 |
| 2014/0346266 A1 | 11/2014 | Matsuo et al. | |

FOREIGN PATENT DOCUMENTS

| | | | | |
|---|---|---|---|---|
| CN | 105981695 A | * | 10/2016 | ............. A01K 89/00 |
| DE | 102018216687 A1 | * | 4/2019 | ............. A01K 89/01 |
| DE | 102018218943 A1 | * | 5/2019 | ........... A01K 89/006 |
| JP | 2018033403 A | * | 3/2018 | ............. A01K 89/01 |
| JP | 2019097431 A | | 6/2019 | |
| JP | 6706661 B2 | | 6/2020 | |

OTHER PUBLICATIONS

Nov. 8, 2024 Office Action issued in Australian Patent Application No. 2023200624.
Sep. 18, 2023 Extended Search Report issued in European Patent Application No. 23155206.8.
Oct. 23, 2023 Office Action issued in Taiwanese Patent Application No. 112109660.
Apr. 19, 2024 Examination Report issued in Australian Patent Application No. 2023200624.
Jan. 30, 2025 Office Action issued in Japanese Application No. 2022-057881.
Feb. 21, 2025 Examination Report issued in European Application No. 23155206.8.

* cited by examiner

*Primary Examiner* — Emmanuel M Marcelo
(74) *Attorney, Agent, or Firm* — Oliff PLC

(57) ABSTRACT

A fishing spinning reel according to the present disclosure has a pinion that is rotationally driven by a rotation operation of a handle rotatably supported on a reel body, a rotor comprising a boss portion that is fixed to the pinion by a fixing structure, and a one-way clutch that is disposed on the pinion and comprises an inner ring, an outer ring, and a holder holding a plurality of rolling members. The fixing structure has a cylindrical member that is a separate member from the inner ring and comprises a first abutting portion covering the boss portion and abutting on the rotor, and a second abutting portion that is located on a radially inner side of the first abutting portion and abuts on a distal end of the inner ring.

6 Claims, 4 Drawing Sheets

FISHING SPINNING REEL

CROSS-REFERENCE TO RELATED APPLICATION

This application claims priority under 35 U.S.C. § 119 to Japanese Patent Application No. 2022-057881 filed on Mar. 31, 2022 in the Japanese Patent Office, the entire contents of which is hereby incorporated by reference.

FIELD

The present disclosure relates to a fishing spinning reel, and more particularly to a fishing spinning reel incorporating a one-way clutch that prevents reverse rotation of a rotor.

BACKGROUND

A fishing spinning reel has a structure including a rotor that rotates in conjunction with a winding rotation operation of a handle and a spool that moves back and forth. Generally, a fishing spinning reel incorporates a reverse rotation prevention mechanism that allows rotation of a rotor in a fishing line winding direction by a rotation operation of a handle and prevents reverse rotation of the rotor when the handle is to be reversely rotated.

For example, as disclosed in JP 2019-97431 A, the reverse rotation prevention mechanism is constituted by a one-way clutch including an inner ring that is fitted into a pinion gear integrally rotated by a rotation operation of a handle to prevent rotation, a holder that is disposed radially outside the inner ring and holds a plurality of rolling members, and an outer ring that is disposed radially outside the holder.

The rotor is attached so as to rotate integrally with the pinion gear. In JP 2019-97431 A described above, a recessed portion extending in an axial direction over a circumferential direction is formed on the side of a distal end of the inner ring of the one-way clutch, a boss portion formed in a center portion of the rotor is fitted into the recessed portion to be seated, and a nut is tightened from the spool side, so that the rotor rotates integrally with the pinion gear.

SUMMARY

In order to miniaturize the one-way clutch, it is necessary to reduce a diameter of the inner ring. For example, in a case where a diameter of the conventional inner ring to be φ10 is changed to φ9 to miniaturize the one-way clutch, if a diameter of the boss portion of the rotor is the same, the above-described recessed portion is thinned, so that a structure in which the boss portion is fitted and fixed cannot be obtained due to the strength. For this reason, it is conceivable to cause a distal end of the boss portion of the rotor to abut on the distal end of the inner ring without forming the recessed portion at the distal end of the inner ring. However, a distance from a position (line roller) to which a load is applied becomes long, and a large moment acts. For this reason, as will be described later, a phenomenon occurs in which the boss portion of the rotor is buckled at the abutting portion.

The present disclosure has been made in view of the above problems, and an object thereof is to provide a structure in which a reel body is reduced in size and weight and durability is improved, in a fishing spinning reel incorporating a one-way clutch.

In order to achieve the above object, a fishing spinning reel according to the present disclosure has a drive shaft that is rotationally driven by a rotation operation of a handle rotatably supported on a reel body, a rotor comprising a boss portion that is fixed to the drive shaft by a fixing structure, and a one-way clutch that is disposed on the drive shaft and comprises an inner ring, an outer ring, and a holder holding a plurality of rolling members. The fixing structure has a cylindrical member that is a separate member from the inner ring and comprises a first abutting portion covering the boss portion and abutting on the rotor, and a second abutting portion that is located on a radially inner side of the first abutting portion and abuts on a distal end of the inner ring.

According to the fishing spinning reel having the above-described configuration, since the fixing structure for fixing the boss portion of the rotor to the drive shaft is not a structure in which the boss portion of the rotor is covered with the inner ring of the one-way clutch, the inner ring can be reduced in diameter, so that the one-way clutch can be reduced in size and weight. In addition, even when a large load acts on a fishing line and a large load (moment) acts on the boss portion of the rotor via a line roller, the load can be received by the first abutting portion at a position close to the line roller of the cylindrical member that is the separate member from the inner ring, so that deformation (buckling phenomenon) of the boss portion due to the repeated load is suppressed, and durability can be improved.

According to the present disclosure, it is possible to obtain a structure in which a reel body is reduced in size and weight and durability is improved, in a fishing spinning reel incorporating a one-way clutch.

DETAILED DESCRIPTION

Figure 1:
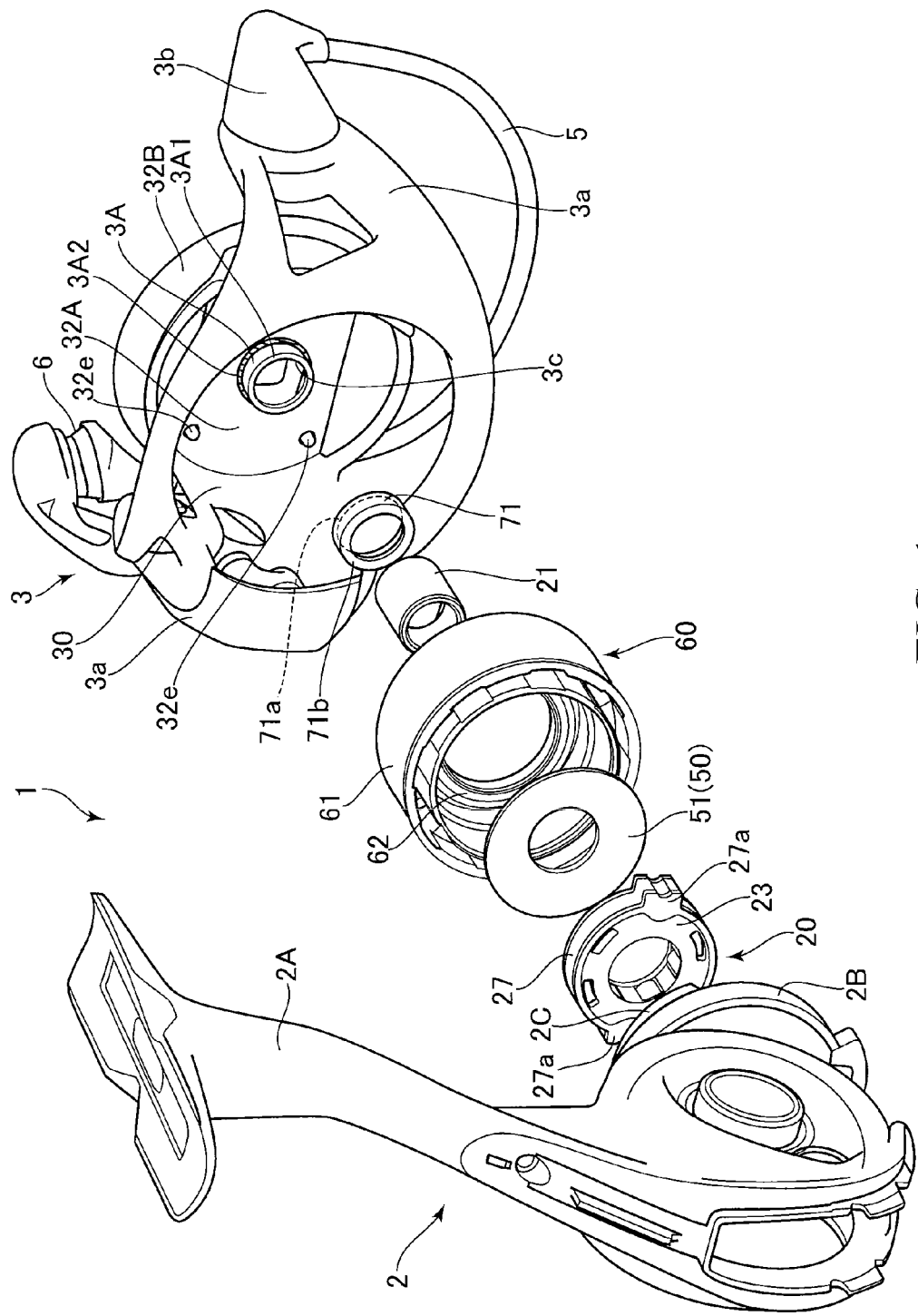
FIG. 1 is an exploded perspective view illustrating an embodiment of a fishing spinning reel according to the present disclosure.
Figure 2:
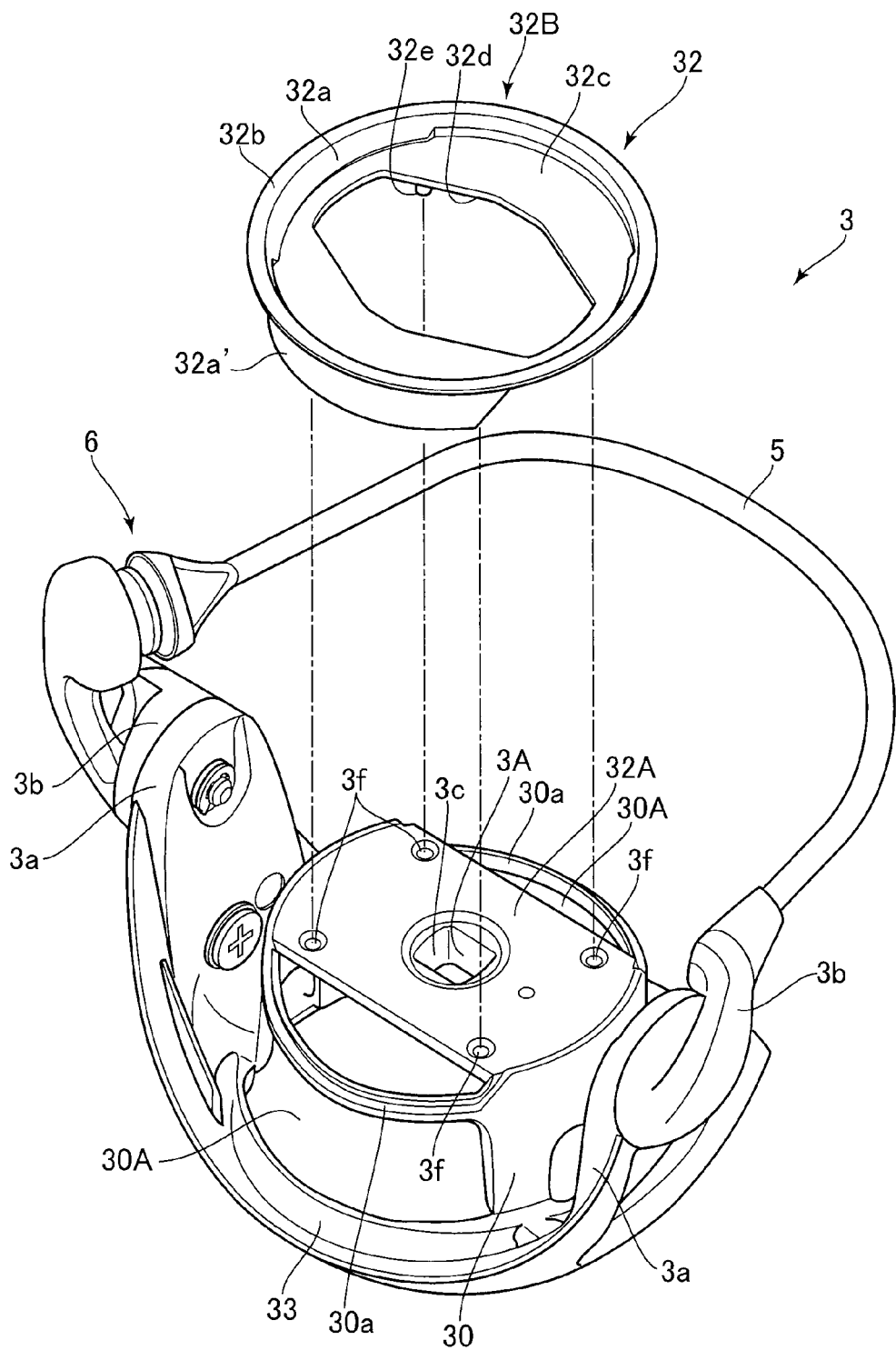
FIG. 2 is a perspective view illustrating a structure of a rotor portion of the fishing spinning reel illustrated in FIG. 1.
Figure 3:
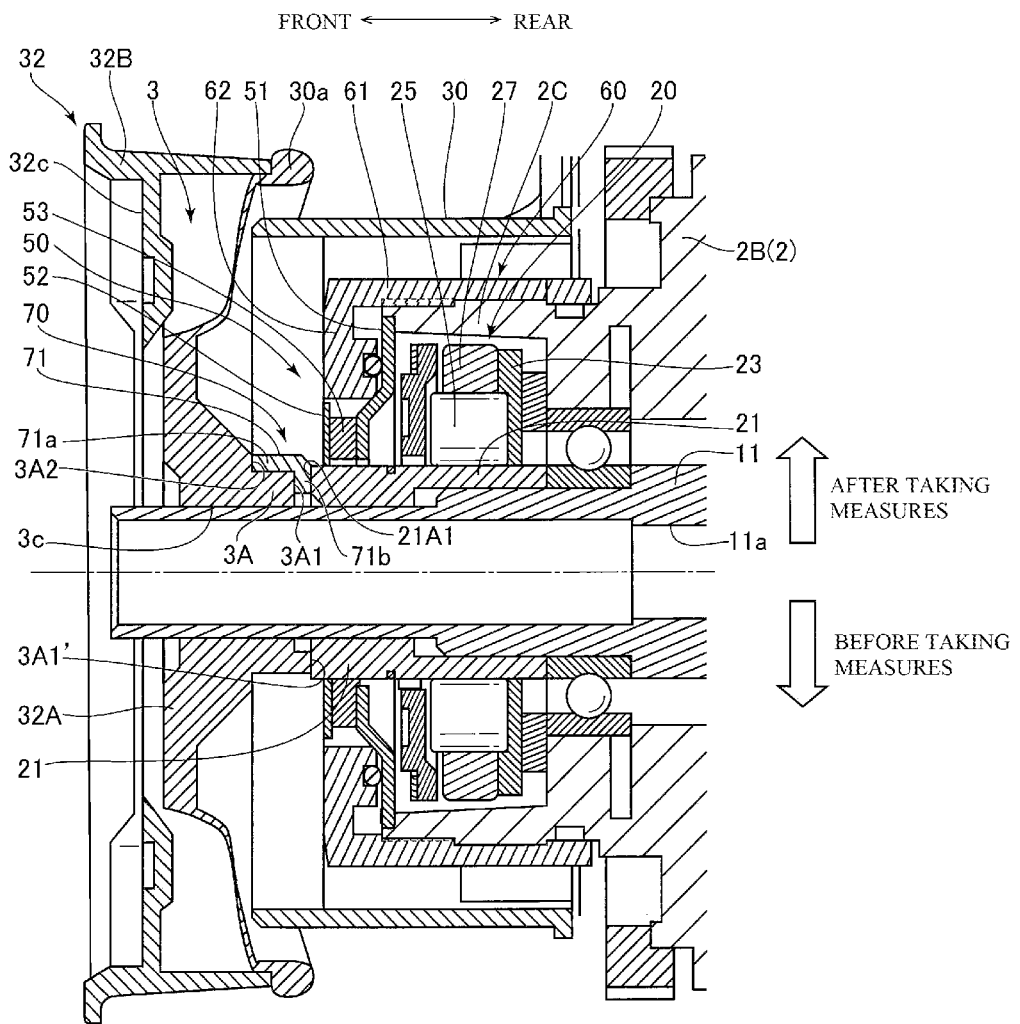
FIG. 3 is a cross-sectional view illustrating a main structure inside the fishing spinning reel illustrated in FIG. 1, which illustrates an example in which a cylindrical member is provided (upper half: after taking measure) and an example in which the cylindrical member is not provided (lower half: before taking measure)

FIGS. 1 to 3 are diagrams illustrating an embodiment of a fishing spinning reel according to the present disclosure. First, an outline of an overall configuration of the fishing spinning reel will be described. Note that, in the following description, "front and rear" mean directions illustrated in FIG. 2.

A reel leg 2A to be mounted on a fishing rod is formed integrally with a reel body 2 of a fishing spinning reel (hereinafter, referred to as the reel) 1 according to the present embodiment. A rotor 3 that is rotatably supported and a spool (not illustrated in the drawings) that is supported to be movable back and forth in synchronization with the rotational motion of the rotor 3 are disposed in front of the reel body 2.

The rotor 3 comprises a pair of arm portions 3a that rotates around the spool, and a bail support member 3b to which a base end of a bail 5 is attached is rotatably supported at a front end of each arm portion 3a between a fishing line winding position and a fishing line releasing position. In this case, one base end of the bail 5 is attached to a fishing line guide portion (line roller) 6 provided integrally with the bail support member 3b.

In the reel body 2, a handle shaft is rotatably supported via a bearing, and a handle is attached to a protrusion end of the handle shaft. The handle shaft is provided with a driving force transmission mechanism that transmits a driving force to the rotor 3 to rotationally drive the rotor when the handle is rotationally operated.

As known, the driving force transmission mechanism comprises a drive gear integrally rotatably mounted on the handle shaft, and a pinion 11 comprising a pinion tooth portion meshing with the drive gear. The pinion 11 extends in a front-rear direction orthogonal to the handle shaft, and has a function as a rotation drive unit (drive shaft) in which a cavity 11a extending in an axial direction is formed. In this case, a spool shaft that engages with a known oscillating mechanism moving the spool back and forth when the handle is rotationally operated is inserted through the cavity 11a, and the spool is mounted on a distal end thereof.

The pinion 11 is rotatably supported by the reel body 1. Further, the pinion 11 extends toward the spool side, and the rotor 3 is integrally rotatably attached to a distal end of the pinion 11. The rotor 3 is fixed by externally fitting a through-hole 3c of a boss portion 3A formed at the center portion into the distal end of the pinion 11 and tightening a nut (not illustrated in the drawings) from the front side toward the rear side. A one-way clutch 20 constituting a reverse rotation prevention device is disposed on the pinion 11.

With the above configuration, when the handle is wound, the rotor 3 is rotationally driven via the driving force transmission mechanism, and the spool is reciprocated in the front-rear direction via the oscillating mechanism and the spool shaft. Therefore, the fishing line is evenly wound around the spool via the fishing line guide portion 6 of the rotationally driven rotor 3.

In the rotor 3 described above, a tubular portion 30 is formed between the pair of arm portions 3a. The front side of the tubular portion 30 is closed by a front wall portion 32, and a rear end is opened in a substantially circular shape. A ring-shaped portion 33 is integrally formed at a rear end of the tubular portion 30 so as to bulge in an arc shape in a radial direction in substantially the same plane, and the ring-shaped portion 33 forms a rear end of the rotor and is integrated with the pair of arm portions 3a by connecting base portions of the pair of arm portions 3a to each other.

The front wall portion 32 comprises a flat bridge 32A connecting an opening front end edge of the tubular portion 30 in the radial direction with a predetermined width, and a cap member 32B mounted on a surface of the bridge 32A. The cap member 32B comprises a circumferential wall 32a, an annular flange portion 32b protruding radially outward at an upper opening edge of the circumferential wall, and a bottom portion 32c in which a substantially rectangular opening 32d is formed in a center region. The circumferential wall 32a comprises a pair of arc walls 32a' hanging down in an arc shape at two facing locations, and bosses 32e are formed at four locations (the number of locations may be arbitrary, and positions are not limited) on a back surface of the bottom portion 32c so as to be mounted on the bridge 32A.

An opening 30A is formed in the tubular portion 30 so as to achieve weight reduction. The opening of the present embodiment is formed in an arc shape along the circumferential direction to a region reaching the ring-shaped portion 33 from the upper side of the tubular portion 30. By forming the opening 30A in the tubular portion 30 as described above, both sides on the front side of the tubular portion 30 are connected by a semi-annular frame 30a.

At the center of the bridge 32A, the boss portion 3A having the through-hole 3c is formed to protrude toward the reel body, and as described above, a nut fixed to the pinion 11 is attached to this portion from the front to the rear. In the bridge 32A, four holes 3f (the number of locations may be arbitrary, and positions are not limited) are formed at positions corresponding to the bosses 32e so that the bosses 32e of the cap member 32B are fitted. The bridge 32A bridges the front end side of the tubular portion 30 between the arm portions 3a, and a space portion is formed between both sides of the bridge 32A and the semi-annular frame 30a.

With respect to the bridge 32A, the bottom portion 32c of the cap member 32B abuts on the surface of the bridge, and the bosses 32e protruding from the holes 3f are welded or the like, so that the cap member 32B is mounted on the bridge 32A to constitute the front wall portion 32 together with the bridge. In this state, the space portion between both sides of the bridge 32A and the semi-annular frame 30a is closed by the bottom portion 32c of the cap member 32B and the arc wall 32a', and the rotor can be efficiently reduced in weight. Although the boss 32e protrudes in FIG. 1, the boss may be crushed at the time of being welded.

Next, the one-way clutch 20 will be described.

As illustrated in FIG. 1, a base portion 2B formed in a substantially disk shape is disposed on the spool side of the reel body 2, and a cylindrical portion 2C is formed on a surface portion of the base portion 2B in the axial direction. The pinion 11 is rotatably supported through a center portion of the cylindrical portion 2C, and the one-way clutch 20 is disposed in an intermediate portion thereof.

The pinion 11 is rotationally driven via the drive gear by the rotation operation of the handle, and the one-way clutch 20 has a function of allowing the rotation of the pinion 11 in the fishing line winding direction and preventing the reverse rotation.

As known, the one-way clutch 20 has an inner ring 21, an outer ring 27, and a holder 23 holding a plurality of rolling members 25.

The inner ring 21 is prevented from rotating with respect to the pinion 11. Specifically, a cross section of the pinion 11 has a shape in which a non-circular portion is partially formed, and the inner ring 21 rotates integrally with the pinion 11 by fitting the non-circular portion of the inner ring 21 into this portion.

The holder 23 is disposed radially outside the inner ring 21 and holds the plurality of rolling members 25 disposed along the circumferential direction. A wedge region that prevents the rotation of each rolling member 25 and a free region that freely rotates the rolling member 25 are formed on the inner peripheral surface of the outer ring 27, and each rolling member is constantly biased to the side of the wedge region by a biasing spring.

A protrusion piece 27a is provided in a part of the outer ring 27 so as to protrude radially outward. This protrusion piece has a function as a stopper that restricts the rotation of the outer ring 27, and in the present embodiment, a pair of protrusion pieces is provided at 180° intervals. The cylindrical portion 2C protruding from the reel body 2 is provided with a notch portion penetrating the cylindrical portion 2C in the radial direction. The notch portion is formed to such an extent that the protrusion piece 27a of the outer ring 27 can be fitted, and the outer ring 27 is fixed to prevent the rotation (the rotation is restricted) by fitting the protrusion piece 27a into the notch portion 2.

The one-way clutch 20 configured as described above is unitized and incorporated in the cylindrical portion 2C. In this case, the cover member of the holder 23 may be mounted on the surface portion of the outer ring 27, or an electrolytic corrosion prevention plate (anticorrosion plate) or the like may be mounted on the surface portion of the outer ring 27. A restriction plate may be disposed adjacent to the one-way clutch so as to restrict the axial movement of the one-way clutch 20. Alternatively, as illustrated in FIGS. 1 and 3, a magnetic seal mechanism 50) may be disposed so as to enhance waterproof and dustproof effects on the one-way clutch 20.

As known, the magnetic seal mechanism 50 comprises ring-shaped magnetic plates (electrode plates) 51 and 52 disposed with a minute gap between the magnetic plates and the outer peripheral surface of the inner ring 21, and a ring-shaped magnet 53 sandwiched between the magnetic plates, and has a configuration in which the gap between the inner ring 21 and the magnetic plates 51 and 52 is filled with a magnetic fluid.

The electrode plates 51 and 52 and the magnet 53 may be unitized as a magnet assembly, may be fixed to the cylindrical portion 2C of the reel body, or may be incorporated in a waterproof cap 60 described later.

In the present embodiment, a waterproof cap 60 is provided on the reel body so as to wrap the cylindrical portion 2C and the one-way clutch 20. The waterproof cap 60 has a shape including a cylindrical portion 61 surrounding the one-way clutch 20 and a cover portion 62 closing an opening on the spool side, and the magnetic plate 51 of the magnetic seal mechanism 50 is in close contact with an inner surface of the cover portion 62.

According to the one-way clutch 20 having the above-described configuration, rotation (reverse rotation) of the handle (rotor 3) in a fishing line feeding direction is prevented.

That is, when the pinion 11 is rotationally driven by rotationally operating the handle in the fishing line winding direction, the inner ring 21 rotates in the same direction together with the pinion 11. At this time, the rolling member 25 held by the holder 23 moves to the free region of the outer ring 27, the rotational force of the inner ring 21 is not transmitted to the outer ring 27, and the rotor 3 can rotate together with the pinion 11 without any problem.

On the other hand, when the inner ring 21 rotates in the reverse direction together with the pinion 11 (the rotor 3 rotates in the fishing line feeding direction), the rolling member 25 held by the holder 23 is located in the wedge region of the outer ring 27 by the biasing spring, and the rotational force of the inner ring 21 is transmitted to the outer ring 27. Since the rotation of the outer ring 27 is restricted by the protrusion piece 27a, this serves as a stopper to prevent the reverse rotation of the pinion 11 and the rotor 3.

In the above configuration, since the outer ring 27 is not fixed by grooves, projections, or the like formed on the inner peripheral surface of the cylindrical portion to prevent the rotation, unlike a conventional case, the one-way clutch 20 can be reduced in diameter as much as possible, and the reel body can be reduced in size and weight. Therefore, the inner ring 21 can also be miniaturized, and for example, the conventional inner ring having diameters of φ10 to φ9 can be used.

When the inner ring 21 is reduced in diameter as described above, in the present embodiment, a fixing structure 70 for fixing the boss portion 3A of the rotor 3 to the pinion is configured as follows.

In the fixing structure 70, the rotor is not fitted into the inner ring 21 of the one-way clutch, but a separate member from the inner ring 21 is disposed so that the boss portion 3A and the inner ring 21 are not brought into contact with each other. Specifically, the fixing structure 70) has a cylindrical member 71 comprising a first abutting portion 71a that covers the outer peripheral surface of the boss portion 3A of the rotor 3 and abuts on the rotor from the axial direction, and a second abutting portion 71b that is located radially inside the first abutting portion 71a and abuts on the distal end of the inner ring 21.

In this case, in the cylindrical member 71 of the present embodiment, the second abutting portion 71b is integrally formed, and the side of the reel body of the cylindrical member 71 is integrally formed in a substantially cap shape in which the outer peripheral surface is bent inward in the radial direction by approximately 90° so as to reduce the diameter. That is, the portion having the reduced diameter is sandwiched between an end face 3A1 of the boss portion 3A on the side of the reel body and an end face 21A1 of the inner ring 21 at the side of the rotor, and the second abutting portion 71b abuts on the end face 21A1 of the inner ring 21. Therefore, the distal end of the inner ring 21 is maintained in a state where the distal end is not in contact with the boss portion 3A. In addition, the first abutting portion 71a of the cylindrical member 71 abuts on a stepped portion 3A2 formed on the radially outer side of the boss portion 3A and is seated.

As described above, since the fixing structure in which the recessed portion for fitting the boss portion 3A as in the related art is formed on the end face of the inner ring 21 having the reduced diameter is not adopted, the durability of the one-way clutch is not deteriorated due to the deformation of the inner ring 21 or the like. Accordingly, the inner ring 21 can be reduced in diameter, and the reel body can be reduced in size and weight. Further, since the first abutting portion 71a and the second abutting portion 71b are formed integrally with the cylindrical member 71, the cylindrical member can be easily assembled.

According to the fixing structure 70 described above, even if a large load acts on the fishing line and a large load (moment) acts on the side of the boss portion 3A of the rotor 3 via a line roller 6, the load (load acting in the axial direction) can be received by the stepped portion 3A2 of the first abutting portion 71a at a position close to the line roller 6 of the cylindrical member 71 that is a separate member from the inner ring 21, so that the deformation of the boss portion 3A due to the repeated load can be suppressed. That is, since the seated portion of the boss portion 3A is the first abutting portion 71a of the stepped portion 3A2 formed on the radially outer side, and a large load (moment) does not act on the region of the second abutting portion 71b having a long distance from the line roller 6, a phenomenon of buckling in the end region of the boss portion 3A of the rotor is eliminated, and the durability can be improved.

In FIG. 3, an example (after taking measures) in which the cylindrical member 71 is disposed is illustrated in an upper half structure with the center axis of the pinion 11 as a boundary, and an example (before taking measures) in which the cylindrical member is not disposed is illustrated in a lower half structure. In the example of the lower half structure, a recessed portion for fitting the boss portion 3A of the rotor is not formed on the end face of the inner ring 21, and the end face (3A1') of the boss portion 3A abuts on the end face of the inner ring 21 as it is to be in a contact state.

In the lower half structure, when a large load acts via the line roller 6, a buckling phenomenon easily occurs on the end face 3A1' of the boss portion 3A, the durability of the rotor 3 is deteriorated, and the durability of the inner ring 21 contacting the end face 3A1' is also deteriorated. In the present embodiment, as in the upper half structure, the cylindrical member 71 covering the boss portion 3A is disposed, and a load is applied to the first abutting portion 71a at the stepped portion 3A2 close to the line roller 6. Therefore, the boss portion 3A is not affected by the buckling action, and the durability can be improved.

Figure 4:
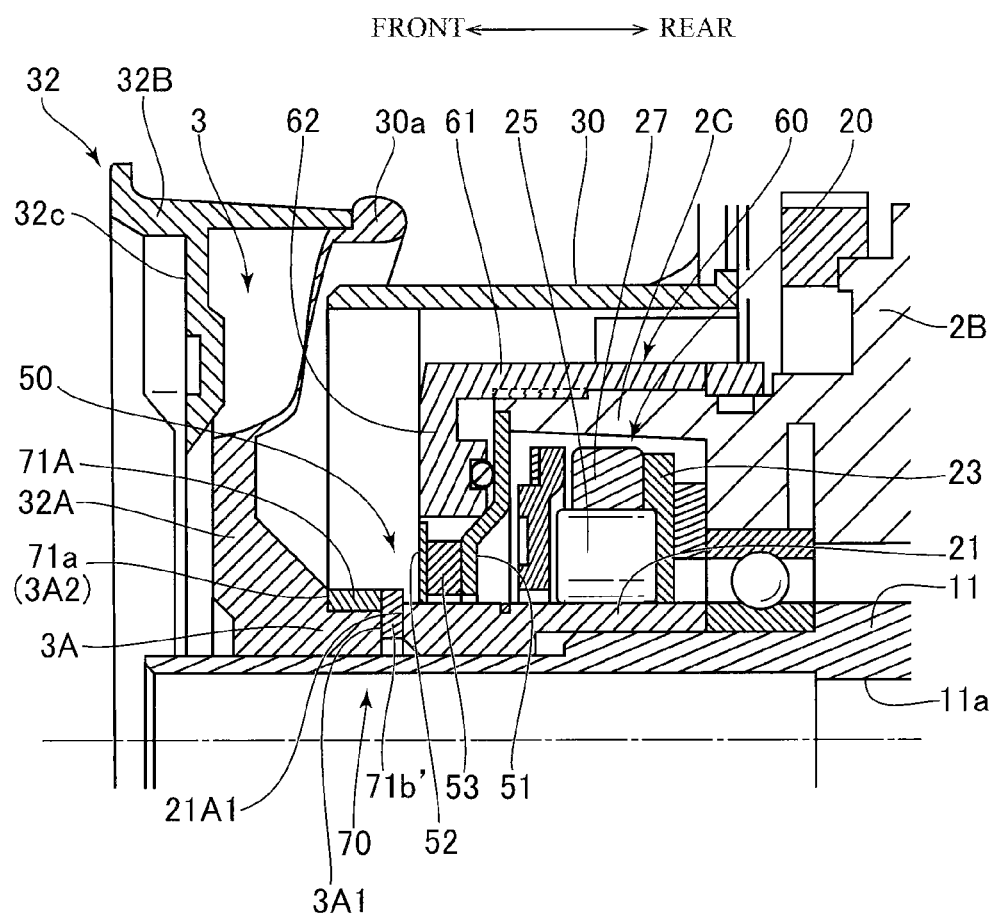
FIG. 4 is a cross-sectional view illustrating a modification of a cylindrical member disposed in a boss portion of a rotor, which illustrates a main structure inside the fishing spinning reel of FIG. 1.

In the above embodiment, the first abutting portion 71a and the second abutting portion 71b are integrally formed in the cylindrical member 71, but may be configured as separate portions. For example, as illustrated in FIG. 4, a second abutting portion 71b' may be a separate member from the cylindrical member 71A, and may be formed of a disc member (washer) interposed between the inner ring 21 and the boss portion 3A.

By forming the second abutting portion 71b as a separate member as described above, it is possible to obtain functions and effects similar to those of the above-described embodiment, and it is not necessary to process the cylindrical member into a U shape (a cylindrical member is simply used, and the washer is substituted for the second abutting portion), so that it is possible to reduce the processing cost.

In the above configuration, the cylindrical members 71 and 71A may be made of a non-magnetic material such as SUS, aluminum, or hard resin. By forming the cylindrical member with such a material, when the magnetic seal mechanism 50 is disposed in the inner ring 21, the magnetic fluid can be prevented from being attracted, and the sealing function can be maintained.

The embodiment according to the present disclosure has been described above. The present disclosure is not limited to the embodiment described above, and various modifications can be made.

The present disclosure is characterized in that a load acting on the fixed portion of the rotor is received using the cylindrical members (collars) 71 and 71A without forming a recessed portion at the end of the inner ring 21 of the one-way clutch 20, and other configurations can be appropriately modified. For example, the configuration of the rotor 3, the configuration of the one-way clutch 20, the configuration of the magnetic seal mechanism 50, and the like are not limited to the structures illustrated in the drawings.

REFERENCE SIGNS LIST 1 fishing spinning reel
2 reel body
2C cylindrical portion
3 rotor
20 one-way clutch
27 outer ring
70 fixing structure
71, 71A cylindrical member
71a first abutting portion
71b second abutting portion

What is claimed is:

1. A fishing spinning reel comprising:
a drive shaft that is rotationally driven by a rotation operation of a handle rotatably supported on a reel body;
a rotor comprising a boss portion that is fixed to the drive shaft by a fixing structure; and
a one-way clutch that is disposed on the drive shaft and comprises an inner ring, an outer ring, and a holder holding a plurality of rolling members,
wherein the fixing structure has a cylindrical member that is a separate member from the inner ring and comprises a first abutting portion covering the boss portion and abutting surfaces of a stepped portion that is formed on a radially outer side of the boss portion from an axial direction of the drive shaft, and a second abutting portion that is located on a radially inner side of the first abutting portion and abuts a distal end of the inner ring.

2. The fishing spinning reel according to claim 1, wherein, in the cylindrical member, the first abutting portion and the second abutting portion are integrally formed.

3. The fishing spinning reel according to claim 1, wherein the second abutting portion is formed of a disc member that is a separate member from the cylindrical member and is interposed between the inner ring and the boss portion.

4. The fishing spinning reel according to claim 1, wherein the first abutting portion of the cylindrical member abuts the rotor, so that the distal end of the inner ring is maintained in a state where the distal end is not in contact with the boss portion.

5. The fishing spinning reel according to claim 1, wherein the cylindrical member is a non-magnetic material, and a magnetic seal mechanism is disposed in a portion of the inner ring.

6. The fishing spinning reel according to claim 1, wherein the first abutting portion abuts two surfaces of the stepped portion that extend orthogonally to each other.

* * * * *